United States Patent Office 3,586,734
Patented June 22, 1971

3,586,734
PROCESS FOR PREPARING α-OLEFIN MIXTURE
Eiichi Ichiki, Hirosuke Ryu, and Yasumiti Namba, Niihama-shi, Japan, assignors to Sumitomo Chemical Company, Ltd., Higashi-ku, Osaka, Japan
No Drawing. Filed Mar. 18, 1968, Ser. No. 714,001
Claims priority, application Japan, Mar. 23, 1967, 42/18,386
Int. Cl. C07c 3/10
U.S. Cl. 260—683.15D                                  5 Claims

ABSTRACT OF THE DISCLOSURE

α-Olefin mixture having about 7 to about 18 carbon atoms is selectively prepared in one step by reacting ethylene with propylene at a reaction temperature of 120° to 180° C. under reaction pressure of 40 to 150 kg./cm.$^2$ in the presence of an alkylaluminum compound as a catalyst.

---

This invention relates to a process for preparing α-olefins, more particularly a process for selectively preparing an α-olefin mixture having about 7 to about 18 carbon atoms in one step by reacting ethylene with propylene in the presence of an alkylaluminum compound as a catalyst.

The term "α-olefins" used in the present invention means β-position-branched or normal α-olefins having at least 4 carbon atoms in one molecule, and is distinguished from ethylene or propylene. An α-olefin mixture having about 7 to about 18 carbon atoms has been used recently as a valuable raw material. For example, α-olefins having 7 to 9 carbon atoms are used as a raw material for vinyl resin plasticizer by converting the α-olefins to corresponding primary alcohols, while α-olefins having 10 to 14 carbon atoms are used as a raw material for a soft type alkylbenzene detergent. Further, α-olefins having 15 to 18 carbon atoms are effectively utilized as a raw material for a higher alcohol detergent. Accordingly, it is desirable to obtain this α-olefin mixture at lower cost by a simple process.

Processes for preparing α-olefins having such carbon atoms, which comprises reacting ethylene with triethylaluminum under pressure to produce higher alkylaluminum compounds than triethylaluminum in the first step, and reacting the resulting reaction products with ethylene either in the presence of a transition metal catalyst such as nickel or cobalt, or at an elevated temperature to substitute the alkyl group of said products with ethylene in the second step have been proposed, as for example, Belgian Patent No. 527,736; Annalen der Chemie 629, 179, 191 (1960; Brennstoff Chemie 41, 320, 1960. However, with a transition metal catalyst, there frequently is a shift of the double bond whereby the α-olefins are isomerized to inner olefins of lesser value. In addition, separation of colloidal transition metal catalyst from the regenerated triethylaluminum was very difficult, and when the triethylaluminum was recycled for reuse without completely separating the catalyst, the growth reaction in the first step was considerably disturbed. These are the disadvantages of the conventional process. Further, when the elevated temperature was employed, there is a disadvantage that the isomerization of α-olefins to the inner olefins was often brought about similarly. Thus, in order to avoid such disadvantages, a very strict reaction condition, such as a reaction temperature of 280° to 320° C. and a residence time of 0.1 to 10 seconds, was employed. In this manner, the prior process had many technical troubles.

Further, another very serious disadvantage of the two-step process is that two different apparatuses for these two steps were necessary, even if the best mode of practice was employed, and as a result much expenses were needed for the apparatuses.

Various direct step processes for conductnig said reaction were also well known and disclosed by Karl Ziegler, etc. [Brennstoff Chemie 33, 193–200 (1952); ibid 35, 321 (1954); Annalen der Chemie 629, 176–178 (1960), etc.].

The one-step processes disclosed in these references were directed to the production of higher α-olefins of even carbon number series in one step by subjecting ethylene to reaction at about 200° C. or higher temperature in the presence of triethylaluminum as a catalyst or subjecting ethylene to reaction in the presence of a mixture consisting of triethylaluminum as a catalyst and nickel and cobalt as co-catalysts and continuously repeating the growth and displacement reaction. However, such one-step reaction had a serious disadvantage that an olefin mixture having a specific molecular weight distribution could not be obtained. That is, it is said that the molecular weight distribution is subject to the following equation [H. Wesslau: Annalen der Chemie 629, 198–208 (1960)].

$$X_p = \frac{\beta}{(1+\beta)^p}$$

Wherein $X_p$ is the mole fraction of olefins represented by the formula of $CH_2=CH-(C_2H_4)_{p-1}C_2H_5$ in the reaction mixture (ethylene ($p=0$) being not taken into account and $\beta$ is the ratio of the displacement reaction rate to the growth reaction rate.

From this equation, it is shown that butylene is principally produced at $\beta>2$; and a large number of individual small amount of olefins having different molecular weights in a wide molecular weight distribution are produced at $$\beta = \frac{1}{2} - \frac{1}{\infty}$$

that is when the range of $\beta$ is between ½ and 1/∞ inclusively.

Accordingly, it is readily inferable that only in a range of $\beta=\frac{1}{2}-2$, an olefin mixture having not so much complicated distribution can be formed. For example, Karl Ziegler disclosed in British patent specification No. 939,-393 that the formation of polymers having the following distribution could be expected in the cases of $\beta=2$ and $\beta=1$.

For $\beta=2$:

| | |
|---|---:|
| $C_4$ | 53.3 |
| $C_6$ | 26.7 |
| $C_8$ | 11.8 |
| $C_{10}$ | 4.94 |
| $C_{12}$ | 1.98 |
| $C_{14}$ | 0.77 |
| $C_{16}$ | 0.29 |
| $C_{18}$ | 0.11 |
| $C_{20}$ | 0.04 |
| $>C_{20}$ | 0.07 |

For $\beta=1$:

| | |
|---|---:|
| $C_4$ | 33.3 |
| $C_6$ | 25.0 |
| $C_8$ | 16.7 |
| $C_{10}$ | 10.4 |
| $C_{12}$ | 6.25 |
| $C_{14}$ | 3.64 |
| $C_{16}$ | 2.08 |
| $C_{18}$ | 1.17 |
| $C_{20}$ | 0.65 |
| $>C_{20}$ | 0.8 |

Further in the known one-step process only such olefin mixtures having less value, that is, the mixtures having a maximum content of $C_4$ olefin was obtained and contents of higher olefins decreased with increasing numbers of carbon atoms in the molecule. Furthermore, the space-time yield of said reaction was not so high, and when it was attempted to increase the rate by elevating the temperature, an increased amount of inner olefin was inevitably formed and the desired α-olefin could not be obtained.

To eliminate such disadvantages, it was proposed in British patent specification No. 939,393 to carry out the reaction in a reaction space having a heat-removing surface of 1–10 cm.$^2$ per unit volume 1 cc. under very strict conditions of a temperature of 225° C. or higher and a residence time of 0.1 sec. to 20 min. However, in the proposed method, although the space-time yield was somewhat improved, but as is obvious from the specification the formed olefin mixture consisted principally of butylene having less value. Particularly, desirable α-olefins having substantially 7 to 18 carbon atoms could be prepared only in small amount. Further, said process required very strict reaction conditions and complicated operation and was restricted only to the continuous operation.

Thus, following the known procedures, it has not been possible to prepare α-olefins of 7 to 18 carbon atoms efficiently and economically from ethylene starting material at low temperatures and in a single stage. Likewise, while ethylene has been reacted with propylene in the presence of a Ziegler-Natta catalyst, the products are high polymers rather than yielding α-olefins of from 7 to 18 carbon atoms.

The present inventors have found that α-olefins having substantially 7 to 18 carbon atoms can be much readily prepared in one step, as compared with the conventional, well-known processes, by reacting ethylene with propylene under the proper reaction conditions, That is, the object of the present invention is to provide a process for selectively preparing α-olefins having 7 to 18 carbon atoms in one step by reacting ethylene with propylene in the presence of an alkylaluminum compound as a catalyst.

Other objects of the present invention will be apparent from the following description.

In order to accomplish these objects, the present invention provides a process for preparing α-olefins having substantially 7 to 18 carbon atoms which comprises reacting ethylene with propylene in the presence of an alkylaluminum compound as a catalyst at a temperature of 120° to 180° C. under a pressure of 40 to 150 kg./cm.$^2$, 30 to 600 parts by mole of total amount of ethylene and propylene being supplied in a mole ratio of ethylene to propylene of 12:1 to 1:6 to one part by mole of said alkylaluminum compound.

In the present invention, ethylene or propylene reacts with the alkylaluminum compound employed as a catalyst to grow the alkyl group of the alkylaluminum compound and to yield a higher alkylaluminum compound than the starting alkylaluminum compound, and next the alkyl groups of the higher alkylaluminum compound are eliminated to yield the corresponding α-olefins.

It is inferable that repetition of the growth reaction and displacement reaction in the reaction system can more readily form α-olefin mixture having substantially 7 to 18 carbon atoms in one step, as compared with the conventional, well-known processes.

One propylene molecule reacts with the alkylaluminum compound to yield a β-position-branched alkylaluminum compound for the very first time just after a number of ethylene molecules react with the alkylaluminum compound to yield a normal alkylaluminum compound, because the ratio of growth reaction rate of ethylene to that of propylene is large. And the resulting β-position-branched alkylaluminum compound has a weaker bonding force between the aluminum atom and carbon atom of the β-position-branched alkyl group than the normal alkylaluminum compound and therefore readily eliminates α-olefins corresponding to the β-branched alkyl groups.

It is also inferable, in addition to said reaction in which ethylene and propylene take part, that the growth reaction of ethylene alone partly takes place. When ethylene grows alone, a normal alkylaluminum compound is formed as an intermediate, from which the normal α-olefins are not split off so fast that the amount of produced normal α-olefins is smaller that that of the β-position-branched α-olefins.

In fact, the product mixture obtained according to the present invention consists of a larger amount of β-position-branched α-olefins and a smaller amount of normal α-olefins, that is, the product mixture consists substantially of β-position-branched α-olefins. Few branched α-olefins other than the β-position-branched olefins or few inner olefins are contained in the product mixture.

Further, ratio of the components of the olefin mixture obtained according to the present invention varies depending upon the reaction conditions, but the reaction product usually contains α-olefins containing 7 to 18 carbon atoms or having a peak of α-olefin distribution between 7 and 18 carbon atoms.

The present method is explained in detail below.

Ethylene and propylene used in the present invention are prepared by thermal cracking of petroleum naphtha or other well-known method, but water contained in ethylene and propylene reacts with an alkylaluminum compound used as a catalyst and its catalytic activity is lost by such reaction. Thus, it is desirable to remove water as much as possible. For example, it is possible to remove water by alkylaluminum compound itself.

The starting material ethylene and propylene are added to the autoclave in a range of mole ratio of ethylene to propylene being 12:1 to 1:6, preferably 6:1 to 1:3.

Generally, if the amount of ethylene to be fed is increased, as compared with that of propylene, less valuable olefins having 19 or more carbon atoms are increased. On the contrary, when the amount of propylene to be fed is increased, less valuable olefins having 19 or more carbon atoms are decreased.

The alkylaluminum compounds used in the present invention as a catalyst are not limited to specific kinds, but are preferably trialkylaluminums having 2 to 18 carbon atoms in one alkyl group or dialkylaluminum hydrides or their mixture, such as triethylaluminum, tri-n-propylaluminum, tri-n-butylaluminum, triisobutylaluminum, tri-n-pentylaluminum, tri-2-methyl-butylaluminum, tri-n-hexylaluminum, tri-2-methyl-pentylaluminum, tri-2-methyl-hexylaluminum, tri-2-ethyl-hexylaluminum, and their corresponding dialkylaluminum hydride. The reason why it is not necessary to limit the alkylaluminums used as a catalyst to the specific kinds is that, even if any alkylaluminum compound as mentioned above is used, the alkylaluminum compound is converted to alkylaluminums which have alkyl groups of 2 to 18 carbon atoms and give the objective α-olefin by repetition of the growth reaction and displacement reaction during the reaction. Accordingly, it is possible to recycle the catalyst for reuse, if desired.

Alkylaluminum is added as a catalyst to the reaction system in a range of mole ratio of total amount of ethylene and propylene to be fed to alkylaluminum compound being 600:1 to 30:1, preferably 400:1 to 100:1. It is not preferable in view of the catalyst loss to add the catalyst in excess, and less addition of the catalyst is disadvantageous as the rate of reaction is retarded.

It is possible to feed each component to the autoclave at the same time or separately, or it is also possible to feed each component as a mixture of at least two components. Inert hydrocarbon may be added to the reaction system independently from said each component or as a mixture therewith, and the reaction may be carried out in the presence of the inert hydrocarbon.

If the reaction temperature exceeds 180° C. in the present invention there is a fear of formation of aluminum or aluminum carbide by the thermal decomposition of the catalyst alkylaluminum compound during the reaction. If the reaction temperature is less than 120° C., the rate of growth reaction becomes low and the reaction is inevitably disadvantageous. Generally, the reaction temperature is 120° to 180° C., preferably 130° to 160° C.

If the reaction pressure exceeds 150 kg./cm.$^2$ in the present invention, the high boiling point products are much formed, and if the reaction pressure is less than 40 kg./cm.$^2$, there appear such undesirable phenomena that the low boiling point products are much formed and the rate of reaction is lowered. Generally, the reaction pressure is 40 to 150 kg./cm.$^2$, preferably 50 to 140 kg./cm.$^2$.

The reaction product obtained by the present method contains a great amount of α-olefin mixture and a small amount of alkylaluminum compounds as catalysts, which can be separated either to α-olefin mixture and alkylaluminum compounds respectively by an ordinary vacuum distillation, or to α-olefin mixture and the corresponding aluminum alcoholates by the vacuum distillation after oxidizing the alkylaluminum compounds as catalysts.

It is possible to recycle the separated alkylaluminum compounds as catalysts for reuse, if desired.

α-Olefin mixture prepared in one step according to the present method is an olefin mixture consisting substantially of α-olefins having 7 to 18 carbon atoms. And the α-olefin mixture has a peak of α-olefin distribution between 7 and 18 carbon atoms, as described above, but it is well known that the present olefin mixture is applied to various uses according to the number of carbon atoms. For example, α-olefins having 7 to 9 carbon atoms are used as a raw material for vinyl resin plasticizer by converting the α-olefins to corresponding primary alcohols, and α-olefins having 10 to 14 carbon atoms are used as a raw material for a soft type alkylbenzene detergent. Further, α-olefins having 15 to 18 carbon atoms are effectively utilized as a raw material for a higher alcohol detergent.

When relatively higher α-olefins are required depending upon a desired use, relatively lower α-olefins once formed are recycled to the reaction system to enhance the amount of the desirable α-olefins.

The present invention can be carried out batchwise or continuously. In the following examples, the present invention is carried out batchwise just to clearly illustrate the mode of the practice of the present invention, but there is not any restriction to continuously carrying out the present invention.

Referring to examples, the present invention is explained below, but it is not necessary to say that the present invention is not limited thereto.

EXAMPLE 1

An autoclave provided with a stirrer, a pressure gage, ethylene feed pipe and propylene feed pipe was flushed with nitrogen gas, and then 9.9 g. (0.050 mole) of tri-isobutylaluminum was added to the autoclave as a catalyst, and 81.2 g. (2.90 moles) of ethylene and 101.0 g. (2.40 moles) of propylene were thereto added. Then, the reaction mixture was heated to a temperature of 140° C. with stirring. Ethylene and propylene were thereto added from the feed pipes respectively at the same temperature to maintain the pressure at about 100 kg./cm.$^2$ during the reaction. When 86.0 g. (3.07 moles) of ethylene and 30.7 g. (0.73 mole) of propylene were completed to add, the reaction was interrupted and the resulting product was cooled. By separating unreacted ethylene and propylene from the reaction mixture, 171.2 g. of olefin mixture having the following components was obtained. In the following table, an olefin having $n$ carbon atoms in one molecule is abbreviated to C$n'$.

| | Percent by weight |
|---|---|
| $C_4'-C_6'$ | 9.5 |
| $C_7'-C_9'$ | 25.3 |
| $C_{10}'-C_{14}'$ | 37.2 |
| $C_{15}'-C_{18}'$ | 19.8 |
| $C_{19}'$ | 8.2 |

It was found by analysis that the olefin mixture consisted substantially of β-position-branched α-olefins and normal α-olefins and further that few branched olefins other than β-position-branched olefins or few inner olefins were contained.

When diisobutylaluminum hydride, tri-n-propylaluminum, tri-n-butylaluminum or corresponding dialkylaluminum hydride or their mixtures were used in place of tri-isobutylaluminum, almost similar results were obtained.

EXAMPLE 2

After an autoclave having a similar structure to that as in Example 1 was flushed with nitrogen gas, 7.6 g. (0.021 mole) of tri-2-ethylhexylaluminum was fed to the autoclave as a catalyst. After 84.0 g. (3.00 moles) of ethylene and 63.0 g. (1.50 mole) of propylene were thereto fed, the reaction mixture was heated to a temperature of 170° C. with stirring. Ethylene and propylene were added thereto from the feed pipes respectively at the same temperature to maintain the pressure at about 140 kg./cm.$^2$ during the reaction. When 129.0 g. (4.61 moles) of ethylene and 16.0 g. 0.38 mole) of propylene were completed to add, the reaction was interrupted, and the product was cooled. By separating unreacted ethylene and propylene, 165.7 g. of olefin mixture having the following components was obtained.

| | Percent by weight |
|---|---|
| $C_4'-C_6'$ | 10.2 |
| $C_7'-C_9'$ | 26.1 |
| $C_{10}'-C_{14}'$ | 38.0 |
| $C_{15}'-C_{18}'$ | 15.4 |
| $C_{19}'$ | 10.3 |

It was determined by analysis that the olefin mixture consisted substantially of β-position-branched α-olefins and normal α-olefins, and further that few branched olefins other than β-position-branched olefins or few inner olefins were contained.

When di-2-ethylhexylaluminum hydride, tri-2-methylhexylaluminum or di-2-methylhexylaluminum hydride or their mixture was used as a catalyst in place of tri-2-ethylhexylaluminum, similar results were obtained.

EXAMPLE 3

After an autoclave having a similar structure to that as in Example 1 was flushed with nitrogen gas, 6.8 g. (0.060 mole) of triethylaluminum was fed to the autoclave as a catalyst. After 51.5 g. (1.84 mole) of ethylene and 7.6 g. (0.18 mole) of propylene were fed thereto, the reaction mixture was heated to a temperature of 150° C. with stirring. Ethylene and propylene were thereto added from the feed pipes respectively at the same temperature to maintain the pressure of about 60 kg./cm.$^2$ during the reaction. When 124.0 g. (4.43 moles) of ethylene and 18.5 g. (0.44 mole) of propylene were added, the reaction was stopped and the reaction mixture was cooled. By separating unreacted ethylene and propylene 126 g. of olefin mixture having the following components was obtained.

| | Percent by weight |
|---|---|
| $C_4'-C_6'$ | 9.7 |
| $C_7'-C_9'$ | 12.7 |
| $C_{10}'-C_{14}'$ | 40.5 |
| $C_{15}'-C_{18}'$ | 23.5 |
| $C_{19}'$ | 13.5 |

It was found by analysis that the olefin mixture consisted substantially β-position-branched α-olefins and normal α-olefins, and further that few branched olefins other than β-position-branched olefins or few inner olefins were contained.

When diethylaluminum hydride, tri-2-ethylhexylaluminum, tri-2-methylhexylaluminum or their dialkylaluminum hydride or their mixture was used as a catalyst in place of triethylaluminum, similar results were obtained.

COMPARATIVE EXAMPLE

After an autoclave having a similar structure to that as in Example 1 was flushed with nitrogen gas, 6.0 g. (0.053 mole) of triethylaluminum was fed to the autoclave. After 52.0 g. (1.9 mole) of ethylene was thereto fed, the reaction mixture was heated to a temperature of 150° C. with stirring. Ethylene was thereto added from the feed pipe at the same temperature to maintain the pressure at about 60 kg./cm.$^2$. After thus adding 152.5 g. (5.5 moles) of ethylene, the reaction stopped and the reaction mixture was cooled. By separating unreacted ethylene, 143.1 g. of olefin mixture having the following components was obtained.

| | Percent by weight |
|---|---|
| $C_4'-C_6'$ | 6.2 |
| $C_8'-C_{10}'$ | 14.8 |
| $C_{12}'-C_{14}'$ | 16.3 |
| $C_{16}'-C_{18}'$ | 14.8 |
| $C_{20}'$ | 49.9 |

About half of the thus obtained olefin mixture was olefins having 20 or more carbon atoms which had less value.

As is obvious from the comparative example, when ethylene is used alone in place of the present starting material ethylene and propylene, an olefin mixture containing a large amount of higher boiling point olefins having 20 or more carbon atoms is only obtained.

What is claimed is:

1. A process for preparing an α-olefin mixture consisting mainly of β-position branched α-olefins and containing mainly α-olefins having a continuous carbon number distribution ranging from about 7 to about 18 carbon atoms, inclusive, and containing a peak in the total distribution curve thereinbetween which comprises reacting ethylene with propylene in the presence of a trialkylaluminum or dialkylaluminum hydride having 2 to 18 carbon atoms in one alkyl group thereof as a catalyst at a temperature of from 120° to 180° C. under a reaction pressure of 40 to 150 kg./cm.$^2$ in one step, the combined amount of ethylene and propylene being from 30 to 600 parts by mole per one part by mole of the alkylaluminum compound wherein the mole ratio of ethylene to propylene is from 6:1 to 1:3.

2. A process according to claim 1 wherein the combined amount of ethylene and propylene is from 100 to 400 parts by mole per one part by mole of the catalyst.

3. A process according to claim 1, wherein the reaction temperature is 130° to 160° C.

4. A process according to claim 1 wherein the reaction pressure is 50 to 140 kg./cm.$^2$.

5. A process according to claim 1, wherein the catalyst is triethylaluminum, triisobutylaluminum, tri-n-pentylaluminum, tri-2-methylbutylaluminum, tri-2-methylhexylaluminum, tri-2-ethylhexylaluminum or their corresponding dialkyl aluminum hydrides.

References Cited

UNITED STATES PATENTS

| 2,699,457 | 1/1955 | Ziegler et al. | 260—683.15 |
| 3,240,839 | 3/1966 | Zosel | 260—683.15 |
| 3,457,322 | 7/1969 | Wentz. | |

FOREIGN PATENTS

| 1,308,672 | 10/1962 | France | 260—683.15 |
| 1,362,163 | 2/1963 | Japan | 260—683.15 |

PAUL M. COUGHLAN, JR., Primary Examiner

U.S. Cl. X.R.

260—677R